United States Patent [19]

Kokoszka et al.

[11] 4,433,584

[45] Feb. 28, 1984

[54] TOTAL PRESSURE PROBE

[75] Inventors: Joseph M. Kokoszka, Enfield; Rocco M. Tommasini, West Hartford, both of Conn.

[73] Assignee: United Technologies Corp., Hartford, Conn.

[21] Appl. No.: 325,258

[22] Filed: Nov. 27, 1981

[51] Int. Cl.³ .............................................. G01F 1/46
[52] U.S. Cl. ................................................. 73/861.66
[58] Field of Search ............... 73/115, 861.65, 861.66, 73/861.67, 861.68, 861.69

[56] References Cited

U.S. PATENT DOCUMENTS 3,029,639  4/1962  Groesbeck ..................... 73/861.65

FOREIGN PATENT DOCUMENTS

305339  4/1918  Fed. Rep. of Germany ... 73/861.66
534228  3/1941  United Kingdom .

*Primary Examiner*—Jerry W. Myracle
*Attorney, Agent, or Firm*—Gene D. Fleischhauer

[57] ABSTRACT

A pressure probe 26 for sensing total pressure in a duct 16, 22 bounding a flow path 12 for a working medium fluid is disclosed. The probe has an alignment portion 32, a sensor portion 34 spaced from the alignment portion leaving a plenum 36 therebetween and passageways 41 for ducting the flow away from the plenum. In one particular embodiment a transition passageway 54 extends between the plenum and the passageway 41. The alignment portion has a first passageway 42 directed towards a second passageway 40 in the sensor portion. The sensor portion has a wall 38 disposed about the second passageway 40. A method is disclosed for sensing total pressure which includes the steps of: diverting a portion of the flow from the working medium flow path to the pressure probe; converting the total pressure of the diverted flow to a static pressure and to a velocity pressure wherein the velocity pressure results from flow along streamlines parallel to the first passageway; inpacting substantially all of the diverted portion of the flow against the sensor portion in the wall region bounding the plenum; and, sensing the static pressure of the flow in the wall region of the plenum to sense total pressure; and ducting all of the diverted flow away from the plenum.

16 Claims, 13 Drawing Figures

ALIGNED FLOW

TOTAL PRESSURE PROBE

DESCRIPTION

1. Technical Field

This invention relates to instrumentation for measuring pressures in a working medium flow path and more particularly to a pressure probe for measuring total pressure of the gases which are flowed along such a flow path. Utility of this probe has been demonstrated at Mach numbers less than one and it is believed that this probe has utility at Mach numbers greater than one.

2. Background Art

In working medium flow paths, such as are found in axial flow gas turbine engines, the total pressure of the working medium gases at a location is measured by sensing total pressure with a probe and converting this sensed pressure into an analogous output with a transducer. One total pressure probe is a kiel-type total-pressure tube discussed at page 381 of the text MECHANICAL MEASUREMENTS by Beckwith and Buck (Addison-Wesley Publishing Company, Inc. 1961). As illustrated in that text the kiel tube consists of a venturi and an impact tube disposed in the venturi such that an annulus is formed between the venturi and the impact tube. During operation of the kiel tube, the flow passes through the annulus. The venturi orients the flow so that the streamlines of the flow passing through the annulus are parallel to the axis of the impact tube.

Performance of the kiel tube is relatively insensitive to the angle formed between the axis of the probe and the streamline of the approaching flow at the inlet to the pressure probe. For purposes of analysis, the angle between the streamline and the axis of the probe is broken into a yaw component (yaw angle) and a pitch component (pitch angle). Because the kiel tube probe is insensitive to a range of yaw and pitch angles the amount of error introduced by changes in the angle of the approaching streamlines is negligible within this range. The accuracy of a kiel tube is also insensitive to the axial location of the impact tube with respect to the venturi. This insensitivity to the axial location of the impact tube avoids the requirement for small tolerances during manufacture of the tube. However, any blockage of the flow leaving the kiel tube causes a disruption of the parallel streamlines in the annulus and decreases the axial length of the region where parallel streamlines exist. Because the streamlines must be parallel to the axis of the impact tube for accuracy, any blockage of the flow leaving the kiel tube causes the accuracy of the kiel tube to become sensitive to the axial location of the impact tube with respect to the cylindrical duct.

Figures 1, 9, 10:
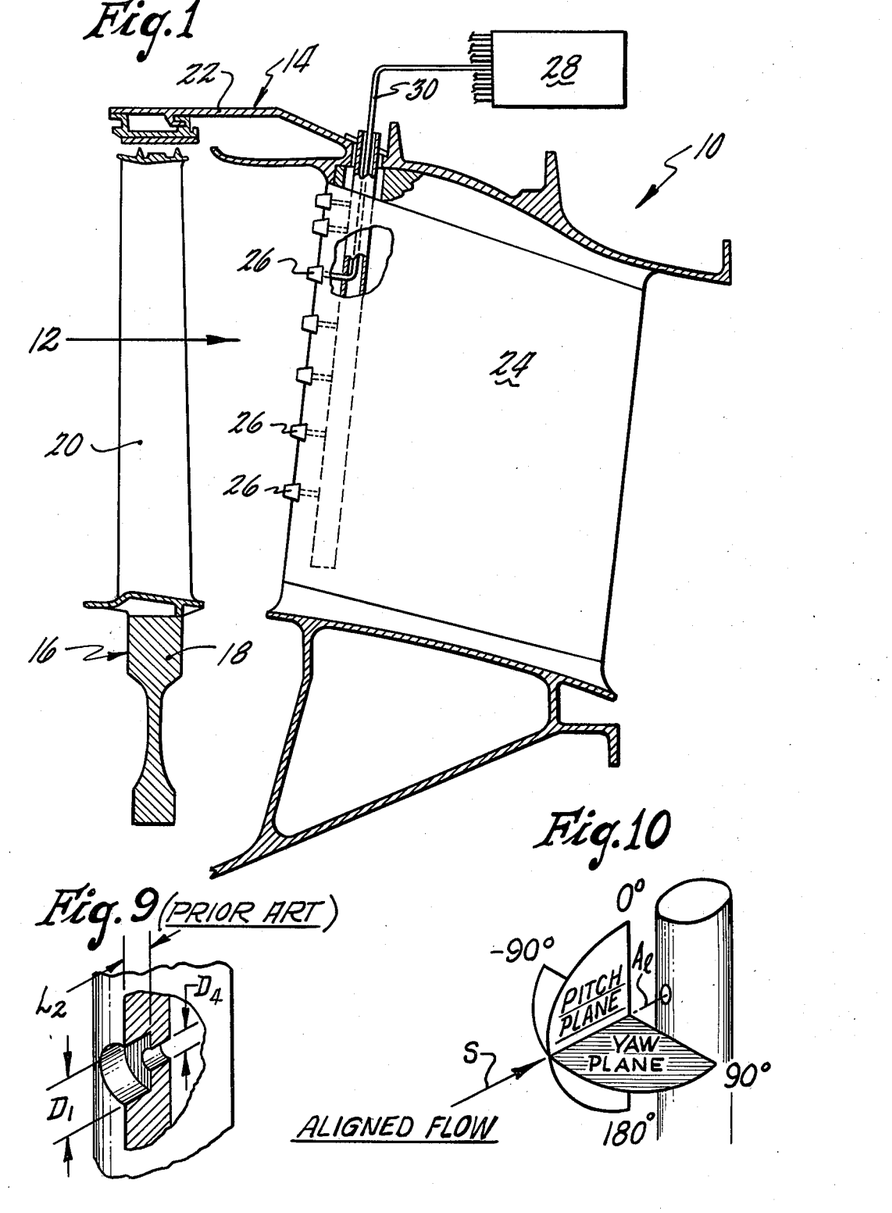
FIG. 1 is a cross-sectional view of the turbine section of a gas turbine engine showing a pressure probe which is an integral part of the leading edge of a stator airfoil.
FIG. 9 is a prior art probe of the type adapted to be mounted in the leading edge of an airfoil.
FIG. 10 is an illustration of a flow of working medium gases having a streamline S aligned with the intersection of the yaw plane and the pitch plane.

The total pressure probe shown in FIG. 9 (Prior Art) is an example of a probe adapted for use in the leading edge of an airfoil structure. This total pressure probe does not rely on the existence of parallel streamlines passing through an annulus around an impact tube and therefore may be installed on the leading edge of an airfoil structure. The probe is relatively easy to manufacture but displays more sensitivity to the yaw and pitch angle of the streamlines of the approaching flow than do kiel type total pressure tubes.

Scientists and engineers are working to develop a pressure probe which may be mounted in a duct or may be formed as an integral portion of the leading edge of an airfoil which displays more insensitivity to the yaw and pitch angle of the approaching flow than does the prior art probe shown in FIG. 9 and yet which is not sensitive to the axial location of the impact sensor as are blocked kiel tube probes to promote accuracy and to facilitate fabrication and installation of the probe under mass production conditions.

DISCLOSURE OF INVENTION

According to the present invention, a probe for sensing total pressure has an alignment portion, a sensor portion spaced from the alignment portion leaving a plenum therebetween and a bleed portion in fluid communication with the plenum and a region outside of the probe to decrease the sensitivity of the probe to yaw and pitch components of the flow and to decrease the sensitivity of the probe to the spacing between the sensor portion and the alignment portion of the probe.

In accordance with the present invention, the total pressure of a working medium flow path is sensed by a probe by: converting the total pressure of a portion of the stream to static pressure and to velocity pressure resulting from streamlines parallel to a first direction; impacting the stream on a wall in the inlet region of a sensor; and ducting the impacted stream away from the sensor region through a bleed passageway.

A primary feature of the present invention is a total pressure probe divided into three portions: an alignment portion; a sensor portion; and a bleed portion. The alignment portion has an axially extending passageway. The sensor portion is spaced from the alignment portion to form a plenum therebetween. The sensor portion has an inlet region adjacent the plenum. A bleed passageway is in fluid communication with the plenum and with the working medium flow path. In one particular embodiment a transition passageway extends between the plenum and the bleed passageway.

A primary advantage of the present invention is the insensitivity of the performance of the pressure probe to yaw and pitch angles of the streamlines in the working medium flow path which results from converting nonaxial components of velocity into static pressure. An advantage of the present invention is the accuracy of the total pressure probe which results from impacting the stream discharged from the alignment portion against a wall in the inlet region to the sensor portion. Another advantage of the present invention is the insensitivity of the accuracy of the pressure probe to the tolerance on the spacing between the sensor portion and the alignment portion of the probe.

Other features and advantages will be apparent from the specification and claims and from the accompanying drawings which illustrate an embodiment of the invention.

BEST MODE FOR CARRYING OUT THE INVENTION

A gas turbine engine embodiment of the engine is illustrated in FIG. 1. The engine has a turbine section 10 (a portion of which is shown) and an annular flow path 12 for working medium gases which extends axially through the engine. The turbine section of the engine has a stator assembly 14 and a rotor assembly 16. The rotor assembly includes a rotor disk 18 having a plurality of blades extending outwardly across the working medium flow path as represented by the single rotor blade 20. The stator assembly includes an outer case 22 which circumscribes the working medium flow path. A plurality of stator struts as represented by a single exhaust strut 24 extends inwardly from the outer case across the working medium flow path. The exhaust strut has a plurality of total pressure probes 26 integrally joined to the strut. Each total pressure probe is in fluid communication with a transducer 28 for converting static pressure levels into an analogous output. A tube 30 extends between the pressure probe and the transducer. No working medium gases are exhausted from the working medium flow path through the transducer.

Figures 2, 3, 4, 5, 6:
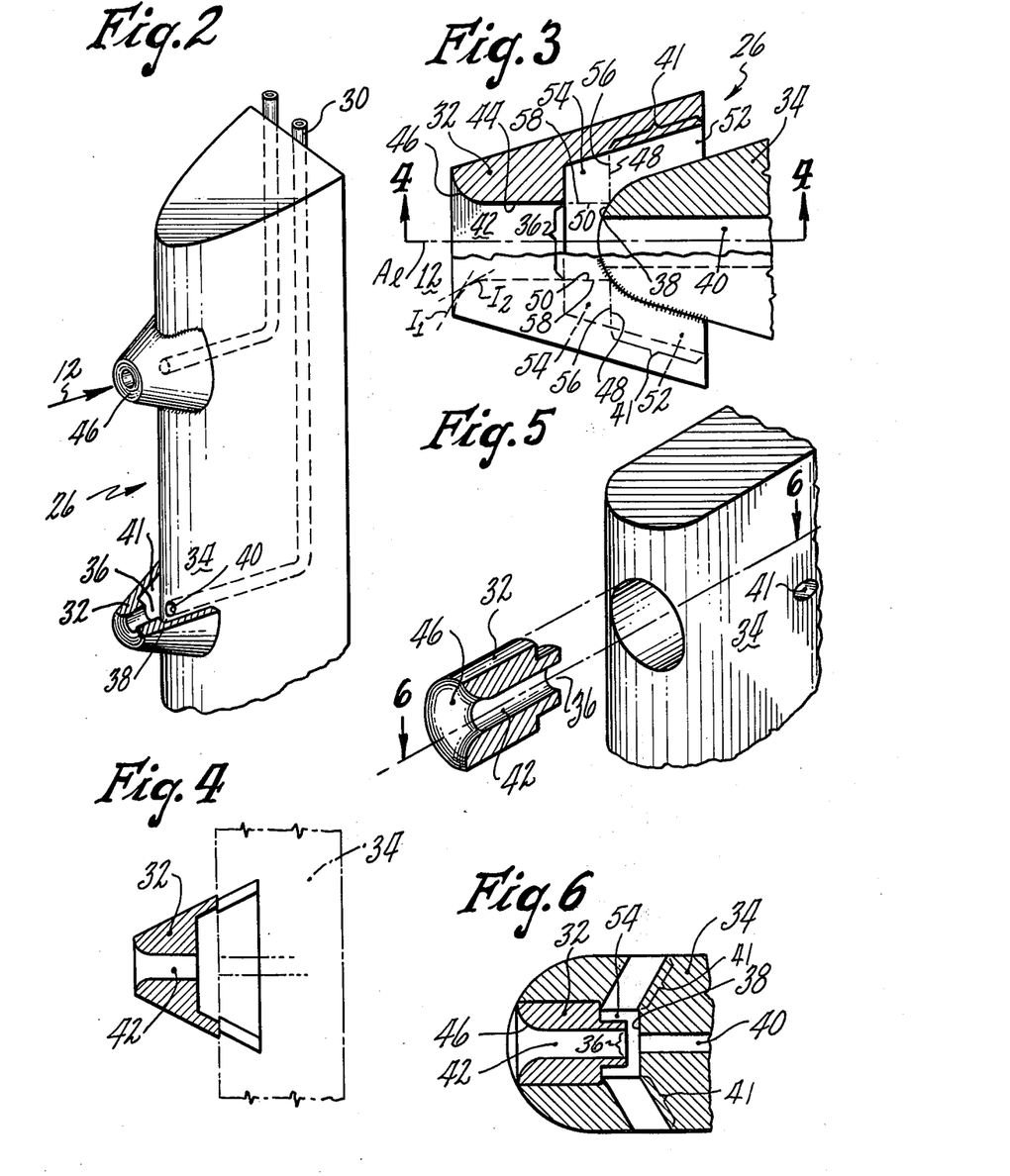
FIG. 2 is an alternate embodiment of the pressure probe shown in FIG. 1 wherein the probe is a separate piece of instrumentation.
FIG. 3 is a plan view from above of a pressure probe of the type shown in FIG. 1 or FIG. 2 partly broken away and sectioned.
FIG. 4 is a cross-sectional view along the lines 4—4 of FIG. 3 with the sensor portion of the probe shown in phantom.
FIG. 5 is an exploded view partly in cross section of an alternate embodiment of the pressure probe shown in FIG. 2 wherein the alignment portion is mounted internally of the probe.
FIG. 6 is a cross-sectional view of the probe shown in FIG. 5 and is taken along the lines 6—6 of FIG. 5.

FIG. 2 is an alternate embodiment of the pressure probe 26 shown in FIG. 1 showing the probe as a separate piece of instrumentation. Portions of the probe are broken away to show the interior of the probe. The probe includes a means for diverting a portion of the flow from the working medium flow path to the pressure probe such as an alignment portion 32. The probe has a means for detecting static pressure such as the sensor portion 34 which is spaced axially from the alignment portion leaving a plenum 36 therebetween. The sensor portion includes a wall 38 and a passageway 40 through the wall for sensing static pressure. The passageway 40 is in flow communication with the tube 30. A means for ducting all the diverted flow away from the probe into a region outside of the pressure probe, such as the passageway 41 is in fluid communication with the plenum. As shown in FIG. 2, the region outside of the pressure probe is the working medium flow path 12 at a point downstream of the entrance to the alignment portion.

FIG. 3 is a plan view of a pressure probe 26 of the type shown in FIG. 1 or FIG. 2 partly in section and partly broken away to show the interior of the probe. The alignment portion of the probe includes a means for ducting the diverted portion of the flow in a first direction, such as a first passageway 42, which is in fluid communication with the working medium flow path 12. The passageway has a longitudinal axis $A_l$. A wall 44 bounds the passageway. A means is provided for converting the total pressure of the flow into static pressure and into velocity pressure wherein the velocity pressure results from flow along streamlines parallel to the first direction. In the embodiment shown, the means is an inlet 46 formed by the wall 44 of the alignment passageway. The wall 44 converges in the downstream direction in the inlet region such that the absolute value of the slope of the wall with respect to the axis of the passageway at a first point $I_1$ in the inlet is greater than the absolute value of the slope of the wall in the inlet at a second point $I_2$ downstream of the first point.

A means is provided for converting substantially all of the velocity pressure of the flow to static pressure. In the embodiment shown, the means is the sensor portion 34. The wall 38 bounds the plenum which is shown by the bracket 36. The second passageway 40 for sensing static pressure is oriented in axial alignment with the first passageway. The second passageway is in fluid communication with the plenum and with the tube 30. The probe has at least one third passageway such as the bleed passageways indicated by the brackets 41. Each third passageway has an inlet 48 in fluid communication with the outlet 50 of the plenum. Each third passageway has an outlet 52 which adapts the passageway to be in fluid communication with the region outside of the probe, such as the working medium flow path 12 or the exterior of the engine. A transition passageway 54 at each third passageway 41 extends between the plenum and the third passageway. Each transition passageway has an outlet 56 and an inlet 58. In the embodiment shown, the summation of the cross-sectional flow areas of the inlets 58 to the transition passageways is equal to the cross-sectional flow area of the outlet 50 of the plenum. The cross-sectional flow area of the inlet 48 of each third passageway is at least as large as the cross-sectional flow area of the outlet 56 of the adjacent transition passageway.

FIG. 4 is a cross-sectional view along the lines 4—4 of FIG. 3 of a portion of the pressure probe shown in FIG. 3 with the sensor portion shown in phantom.

FIG. 5 is an exploded view of an alternate embodiment of the pressure probe shown in FIG. 2 wherein the exterior of the alignment portion 32 of the probe is mounted internally of the probe.

FIG. 6 is a cross-sectional view of the probe shown in FIG. 5. The probe has a sensor portion 34 spaced from the alignment portion leaving a plenum therebetween as shown by the bracket 36. The probe has two third passageways as indicated by the brackets 41. A transition passageway 54 at each third passageway extends between the plenum and the third passageway. The transition passageways 54 are in fluid communication one to the other.

Figure 7:
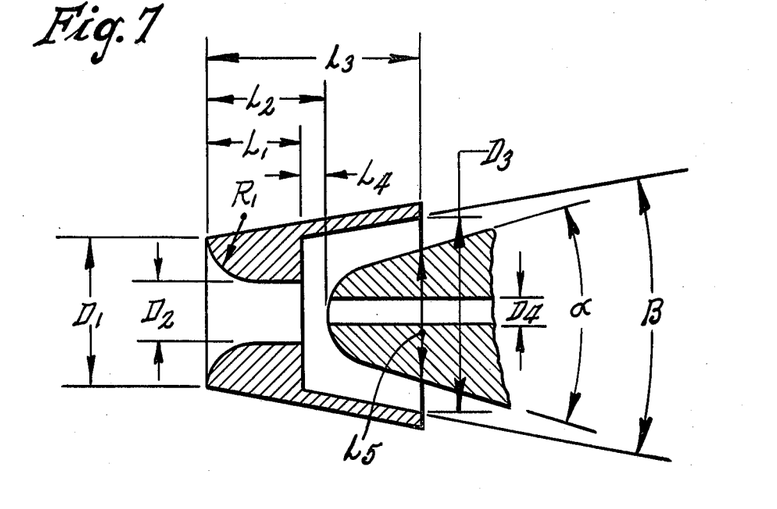
FIG. 7 is a particular embodiment of the pressure probe shown in FIG. 2.

FIG. 7 is a particular embodiment of the pressure probe shown in FIG. 2.

Figure 8:
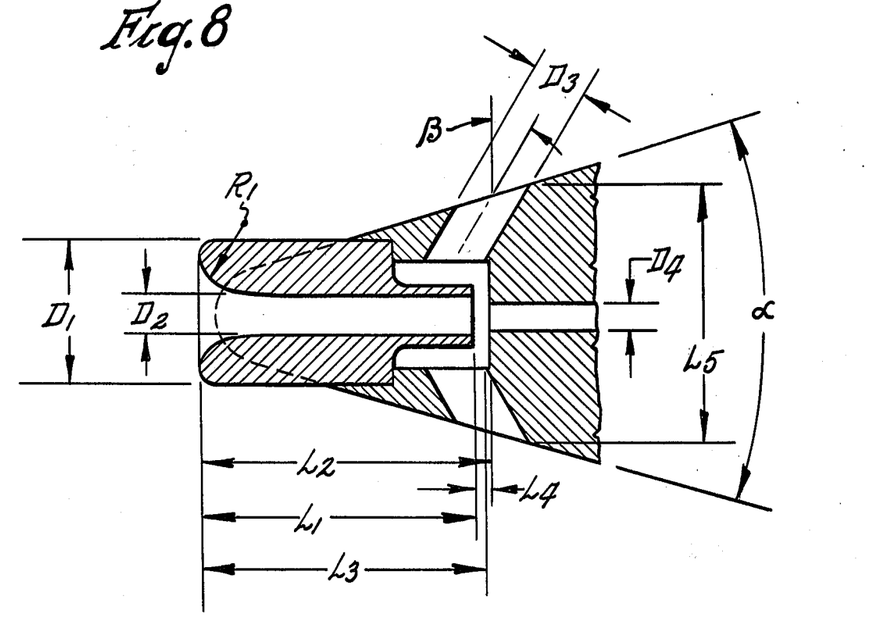
FIG. 8 is an alternate embodiment of the pressure probe shown in FIG. 6 showing the pressure probe mounted in the leading edge of an airfoil.

FIG. 8 is an alternate embodiment of the pressure probe shown in FIG. 6 showing the pressure probe mounted in the leading edge of an airfoil. A prior art probe is shown in FIG. 9 and is marked prior art. The dimensions of the probes are shown in Table I below. Lengths $L_1$, $L_2$, $L_3$ and $L_4$ are measured parallel to the longitudinal axis $A_1$ of the alignment portion 32 of the probe. Diameters $D_1$, $D_2$ and $D_4$ are measured about the longitudinal axis of the probe.

TABLE I

|        | FIG. 7 Probe inches (mm) | FIG. 8 Probe inches (mm) | FIG. 9 Prior Art Probe inches (mm) |
|--------|--------------------------|--------------------------|-------------------------------------|
| $D_1$  | .250 (6.35)              | .198 (5.02)              | .120 (3.05)                         |
| $D_2$  | .100 (2.54)              | .070 (1.78)              | —                                   |
| $D_3$  | .335 (8.509)             | .089 (2.26)              | —                                   |
| $D_4$  | .040 (1.02)              | .040 (1.02)              | .040 (1.02)                         |
| $L_1$  | .162 (4.11)              | .272 (6.91)              | —                                   |
| $L_2$  | .200 (5.08)              | .300 (7.62)              | .050 (1.27)                         |
| $L_3$  | .362 (9.19)              | .244 (6.20)              | —                                   |
| $L_4$  | .028 (.711)              | .028 (.711)              | —                                   |
| $L_5$  | .265 (6.73)              | .260 (6.60)              | —                                   |
| $R_1$  | .100 (2.54)              | .068 (1.73)              | —                                   |
| $\alpha$ | 34°                    | 34°                      | —                                   |
| $\beta$  | 20°                    | 38°                      | —                                   |

FIG. 10 is an illustration of a flow of working medium gases having a streamline S aligned with the longitudinal axis of the inlet to the alignment portion of the probe. Flow having streamlines at an angle to the streamline S aligned with the longitudinal axis may be broken up into a component in a yaw plane (yaw angle) and a component in a pitch plane (pitch angle) for purposes of analysis of the performance of the probe. The pitch plane extends between zero degrees (0°) and one hundred eighty degrees (180°) and the yaw plane extends between ninety degrees (90°) and minus ninety degrees (−90°).

During operation of the engine, working medium gases are flowed along the annular flow path 12. A portion of the flow is diverted from the working medium flow path to the inlet 46 of the alignment portion 32 of the probe. The alignment portion 32 of the probe is designed to convert the total pressure of the flow to a static pressure and to velocity pressure wherein the velocity pressure results from flow along streamlines parallel to the alignment passageway. As will be realized, it is theoretically impossible to convert all of the nonparallel velocity components (streamlines) into static pressure; however it is believed from performance data that substantially all (ninety-nine percent (99%)) of the nonparallel velocity components are converted into static pressure. The flow is ducted along the alignment passageway in the direction of the alignment passageway. A portion of the static pressure is converted to velocity pressure. The diverted flow is discharged from the alignment passageway and is directed across the plenum 36 towards the sensor portion 34. The diverted portion of the flow is impacted against the sensor portion 34 of the probe. The flow is impacted against the wall 38 bounding the plenum and against the gas disposed in the passageway 40 for sensing static pressure. Because the passageway 40, the tube 30 and the transducer 28 form a closed cavity having no exit, the gas in the passageway 40 of the sensor portion acts as a relatively incompressible fluid at the gas velocities within the probe. The probe is designed to impact all of the diverted portion of the flow against the wall and the incompressible fluid in the passageway and thus is designed to create a stagnation pressure in the region of the plenum 36 adjacent the wall. As will be realized it is theoretically impossible to impact the entire amount of the diverted portion of the flow against the sensor. Substantially all of the diverted portion of the flow is impacted against the sensor portion (ninety-nine percent, 99%) and to the extent that the flow is not impacted this introduces an error into the accuracy of the probe. Where the error is relatively small (less than one percent (1%) of the velocity pressure of the free stream) and is constant over the pitch and yaw range, the readings of the probe are easily compensated for through calibration of the probe. Because substantially all of the diverted portion of the flow is impacted against the wall and the incompressible fluid in the sensor passageway and is at zero velocity in the wall region of the plenum, the static pressure of the flow in the wall region of the plenum is substantially equal to the stagnation pressure (total pressure) of the flow. All of the impacted, diverted flow is ducted away from the plenum by the third passageways 41. The third passageways establish a difference in static pressure under operative conditions between the inlet 46 to the alignment portion and the outlet of the third passageway such that the portion of the working medium gases which enters the alignment portion is discharged away from the plenum into a region outside of the pressure probe such as the working medium flow path 12.

Figure 11:
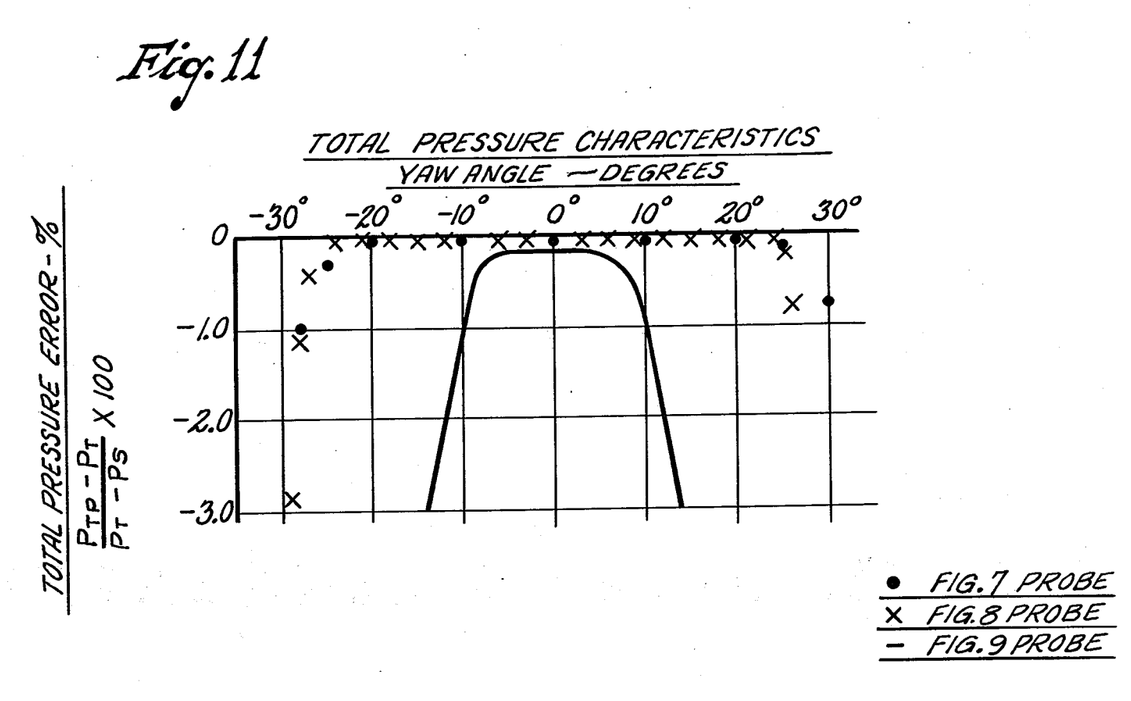
FIG. 11 is a graph of the total pressure characteristic of the probes shown in FIG. 7, FIG. 8 and FIG. 9 showing the error in total pressure for each probe as a non-dimensionalized percentage of velocity pressure versus the yaw angle in degrees.
Figure 12:
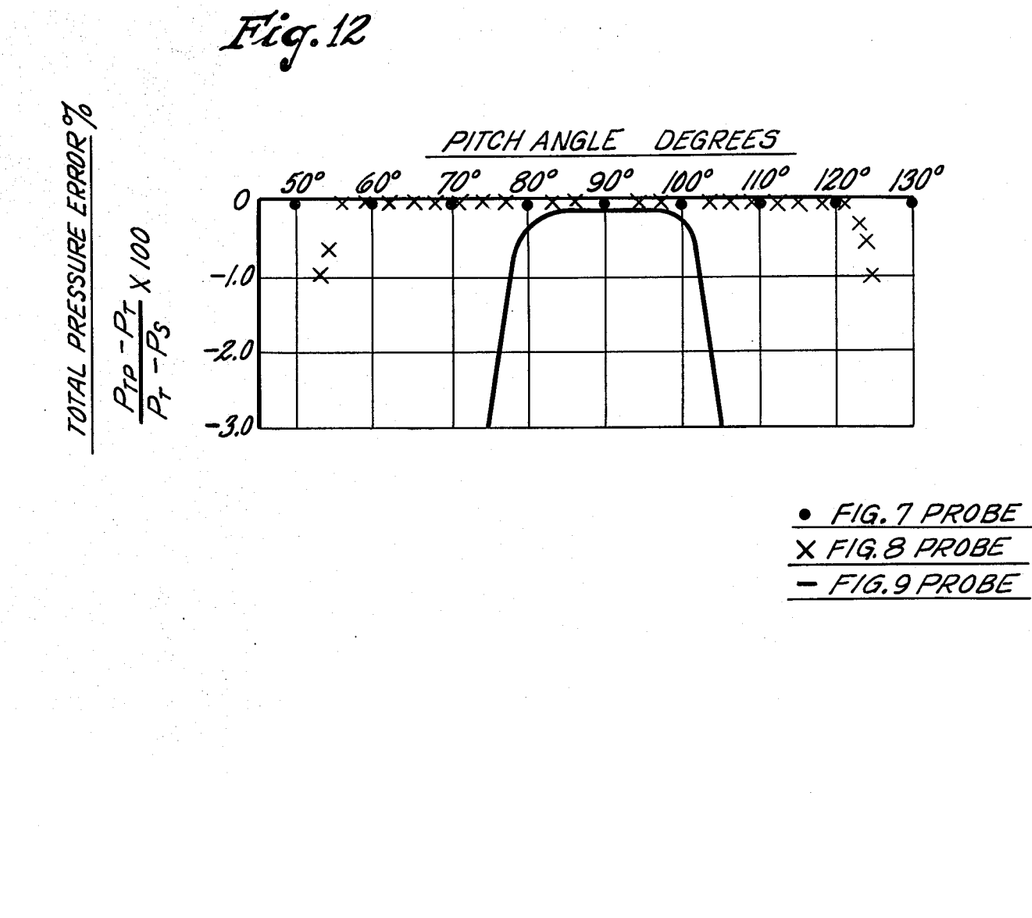
FIG. 12 is a graph of the total pressure characteristic of the probes shown in FIG. 7, FIG. 8 and FIG. 9 showing the error in total pressure for each probe as a non-dimensionalized percentage of velocity pressure versus the pitch angle in degrees.

The total pressure error characteristics for the probe shown in FIG. 7, the probe shown in FIG. 8 and the prior art probe shown in FIG. 9 are plotted in FIG. 11 (yaw) and FIG. 12 (pitch). The total pressure error in percent is nondimensionalized by subtracting from the indicated total pressure $P_{tp}$ the true total pressure $P_t$ and dividing that quantity by the true total pressure $P_t$ of the working medium flow path minus the true static pressure $P_s$ of the working medium flow path $(P_{tp}-P_t)/(P_t-P_s)$.

As can be seen from FIG. 11 and FIG. 12, the sensitivity of the probes shown in FIG. 7 and FIG. 8 to the yaw angle and the pitch angle of the flow is decreased as compared with the sensitivity of the prior art probe shown in FIG. 9.

A distinct and particular advantage of the probes shown in FIG. 7 and FIG. 8 is the insensitivity of the probe to the distance $L_4$ across the plenum 36 between the alignment portion 32 and the sensor portion 34. It was found through experimentation that variations in the length $L_4$ had a negligible effect on the total pressure error of the probe providing the length was a minimum of eight thousandths (0.008) of an inch (two tenths (0.2) millimeters). Below eight thousandths (0.008) of an inch the accuracy was affected and the total percent error increased significantly. Beyond eight thousandths of an inch and to a distance of one hundred thousandths (0.100) of an inch (two and fifty-four hundredths (2.54) millimeters) the accuracy remained relatively constant over the operating yaw and pitch range of the probe in which the probe was insensitive to the yaw angle and the pitch angle of the streamlines of the approaching flow. The distinct and particular advantage of the insensitivity of the error to the distance $L_4$ is that as the probes are manufactured, the spacing between the alignment portion and the sensor portion may have a very large tolerance. For example, the tolerance might be twenty thousandths of an inch for a length $L_4$ of fifty thousandths of an inch. Such a large tolerance on the spacing greatly facilitates mass production of the probe and installation of the probe under mass production conditions.

The flow interaction taking place within the plenum of the probe is not known with certainty; however, the following explanation is believed to be the most plausible explanation based on experimentation which has been performed. Spacing the alignment portion of the probe from the sensor portion of the probe at less than eight thousandths of an inch causes the incoming flow to regard the probe of the dimensions shown in FIG. 7 and FIG. 8 as an impact tube and to perform as does a probe having no alignment portion in the probe. Accordingly, the sensitivity of the probe to yaw and pitch angles is greatly increased and approximates the sensitivity of the prior art design shown in FIG. 9. It is theorized that spacing the alignment portion from the sensor portion by a distance greater than eight thousandths of an inch avoids the formation of eddy currents in the transition passageway 56. These eddy currents block the flow from exiting the plenum and cause the probe to function as does the prior art probe.

Experimentation showed that satisfactory performance occurred for the FIG. 7 and FIG. 8 probes: where the cross-sectional flow area of the inlet of the third (bleed) passageway was at least as large as the cross-sectional flow area of the outlet 56 of the transition passageway 54; where the inlet 58 cross-sectional flow area of the transition passageways 54 was equal to the cross-sectional flow area of the outlet 50 of the plenum; where the summation of the minimum cross-sectional flow areas of the third (bleed) passageways 41 was at least twice the minimum cross-sectional flow area of the first (alignment) passageway 42; and where the second passageway 40 in the sensor portion 34 was smaller than the first passageway 42 in the alignment portion.

Figure 13:
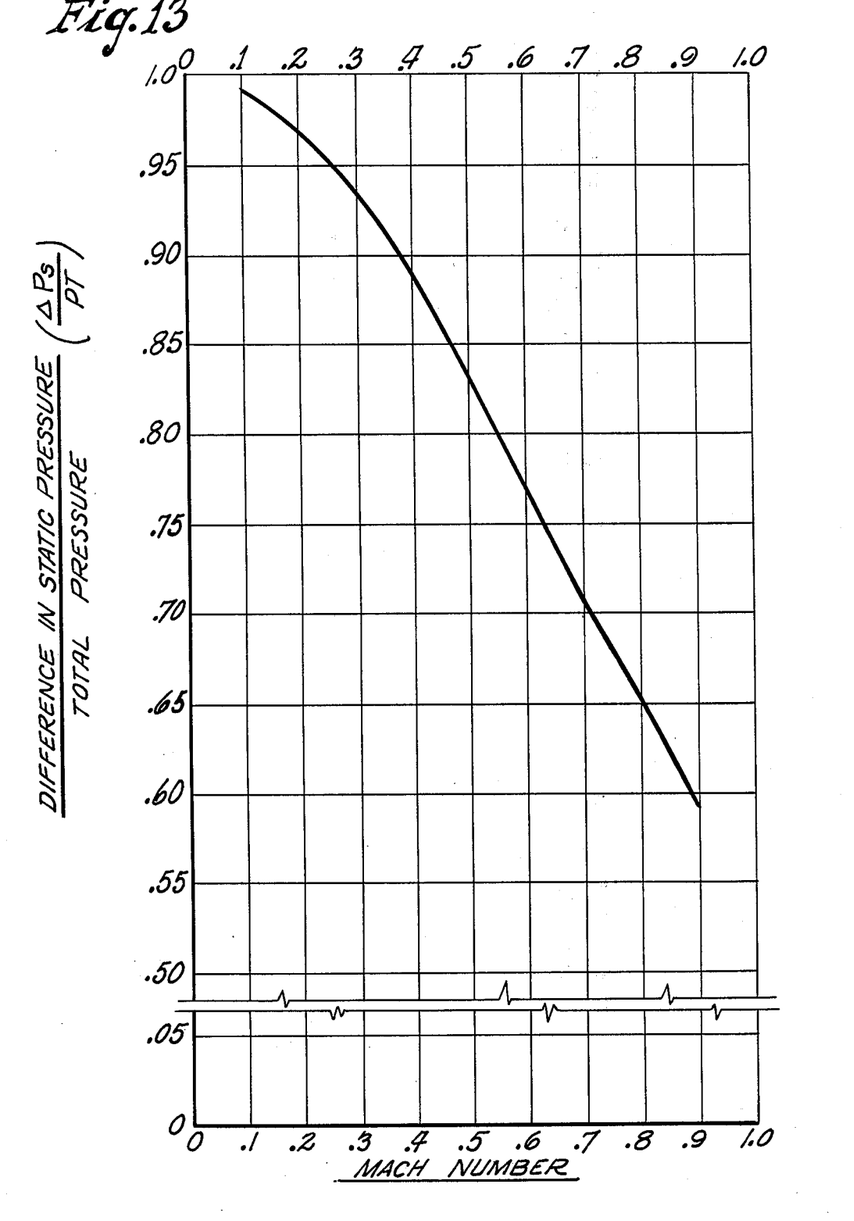
FIG. 13 is a graph of the difference in static pressure for a given Mach number.

The pressure probe shown in FIG. 7 and FIG. 8 has a bell mouthed inlet formed with a radius $R_1$. It is believed for probes of the type shown in FIG. 7 and FIG. 8, that the difference in static pressure at a given Mach number between the inlet 46 to the alignment portion 32 and the outlet 52 from the third (bleed) passageway 41 is at least equal to the difference in static pressure shown in FIG. 13 for a given Mach number. This insures that the flow entering the plenum does not interfere with the flow leaving the plenum. The difference in static pressure between the inlet to the third passageway and the outlet to the third passageway is no greater than ten percent (10%) of the difference in static pressure between the inlet to the alignment portion and the outlet from the third passageway to insure that eddy currents are blocked from forming at the outlet of the plenum.

Although the invention has been shown and described with respect to preferred embodiments thereof, it should be understood by those skilled in the art that various changes and omissions in the form and detail thereof may be made therein without departing from the spirit and the scope of the invention.

We claim:

1. A method of sensing total pressure in a duct bounding a flow path for a working medium fluid utilizing a pressure probe having a flow alignment passageway extending to the interior of the probe and a sensor portion comprising the steps of:
   diverting a portion of the flow from the working medium flow path to the pressure probe;
   converting the total pressure of the diverted flow in the alignment passageway to a static pressure and to a velocity pressure, wherein the velocity pressure results from flow along streamlines parallel to the alignment passageway;
   ducting all the flow from the alignment passageway into a plenum;
   impacting substantially all of the diverted portion of the flow against a sensor portion having a wall bounding the plenum to convert substantially all of the velocity pressure of the flow into static pressure in the wall region of the plenum;
   sensing the static pressure of the flow in the wall region of the plenum; and
   ducting all of the diverted flow away from the plenum.

2. A method of sensing total pressure using a probe which has an alignment portion having a first passageway disposed in the alignment portion about a longitudinal axis of symmetry, a sensor portion spaced from the alignment portion leaving a plenum therebetween in fluid communication with the first passageway, and a bleed portion wherein the bleed portion is in fluid communication with the plenum and the working medium flow path, comprising the steps of:
   diverting a portion of the flow from the working medium flow path to the passageway of the alignment portion;
   converting substantially all of the total pressure of the diverted flow to a static pressure and to velocity pressure at the inlet to the alignment passageway wherein the velocity pressure results from flow along streamlines parallel to the alignment passageway;
   converting a portion of the static pressure of the diverted flow to velocity pressure wherein the velocity pressure results from flow along streamlines parallel to the longitudinal axis of the alignment passageway;
   converting substantially all of the velocity pressure of the working medium fluid leaving the alignment passageway and entering the plenum to static pressure at the entrance to the sensor portion;
   converting the static pressure of the working medium fluid into velocity pressure in the bleed portion of the probe such that the static pressure of the free stream is equal to the static pressure in the bleed portion of the probe at the point of communication between the bleed portion and the working medium flow path to duct the working medium gases from the plenum into the working medium flow path.

3. The invention as claimed in claim 2 wherein the step of converting substantially all of the velocity pressure of the working medium discharged from the alignment passageway to static pressure includes the step of directing the entire stream of working medium gases discharged from the alignment passageway towards a wall disposed about the inlet region to the sensor portion of the probe.

4. The pressure probe as claimed in claim 3 wherein the summation of cross-sectional flow areas of the third passageways is at least twice the minimum cross-sectional flow area of the alignment passageway.

5. The invention as claimed in claim 3 wherein the cross-sectional area of the passageway at the inlet to the sensor portion is less than the diameter of the passageway in the alignment portion at the inlet to the plenum.

6. A pressure probe in fluid communication with a region outside of the probe for sensing the total pressure of working medium fluid in a flow path for working medium gases which comprises:
   means for diverting a portion of the flow from the working medium flow path to the pressure probe which includes
      means for ducting the diverted portion of the flow in a first direction; and
      means for converting the total pressure of the flow into static pressure and into velocity pressure wherein the velocity pressure results from flow along streamlines parallel to the first direction;
   means for detecting static pressure;
   means for converting substantially all of the velocity pressure of the diverted flow to static pressure at a region adjacent to the means for detecting static pressure; and
   means for ducting all of the diverted flow away from the probe into the region outside of the pressure probe.

7. The pressure probe of claim 6 wherein the region outside of the pressure probe is the working medium flow path.

8. The pressure probe of claim 6 wherein the probe has an alignment portion, a sensor portion spaced from the alignment portion leaving a plenum therebetween, the sensor portion having a wall bounding the plenum and a passageway through the wall for sensing static pressure and wherein the means for ducting the diverted portion of the flow in the first direction is the alignment portion of the probe, the means for detecting static pressure is the sensor portion of the probe which has a passageway for sensing static pressure, and the means for converting substantially all of the velocity pressure of the diverted flow to static pressure is the sensor portion having a wall disposed about the passageway, the wall being spaced from the alignment portion leaving the plenum therebetween.

9. A pressure probe for sensing total pressure in a flow path for working medium gases, the probe having working medium gases passing through the probe which comprises:
   an alignment portion which includes
      a first passageway in fluid communication with the working medium flow path, the first passageway having a longitudinal axis, and
      a wall bounding the passageway, the wall forming an inlet which converges in the downstream direction such that the absolute value of the slope of the wall at a first point in the inlet with respect to the longitudinal axis of the passageway is greater than the absolute value of the slope of the wall in the inlet at a second point downstream of the first point;
   a sensor portion spaced axially from the alignment portion leaving a plenum therebetween, the sensor portion having a second passageway which is oriented in axial alignment with the first passageway and which is in fluid communication with the plenum;
   wherein the probe has at least one third passageway having an inlet in fluid communication with said plenum and an outlet which adapts the third passageway to be in fluid communication with a region outside of the probe to establish a difference in static pressure under operative conditions between the inlet to the alignment portion and the outlet of the third passageway such that the portion of the working medium gases which enters the alignment portion is discharged from the third passageway.

10. The invention as claimed in claim 9 wherein the alignment portion is mounted on a stationary airfoil extending across the working medium flow path and the sensor portion is mounted in the leading edge of the airfoil.

11. The pressure probe as claimed in claim 10 wherein the plenum has an outlet and each transition passageway has an inlet wherein the total summation of inlet cross-sectional flow areas of the transition passageways is equal to the cross-sectional flow area of the outlet of the plenum.

12. The invention as claimed in claim 9 wherein the alignment portion is mounted within the leading edge of an airfoil and at least one third passageway extends through the airfoil.

13. The invention as claimed in claim 9 wherein the region outside of the probe is the working medium flow path.

14. The pressure probe as claimed in claim 9 wherein the third passageway has an inlet and wherein the difference in static pressure at a given Mach number between the inlet to the alignment portion and the outlet from the third passageway is at least equal to the difference in static pressure shown in FIG. 13 for the given Mach number and wherein the difference in static pressure between the inlet to the third passageway and the outlet of the third passageway is no greater than ten percent of said difference in static pressure between the inlet to the alignment portion and the outlet from the third passageway.

15. The pressure probe as claimed in claim 9 wherein a transition passageway at each bleed passageway extends between the plenum and the third passageway, the transition passageway having an outlet, the third passageway having an inlet wherein the cross-sectional flow area of the inlet of the third passageway is at least as large as the cross-sectional flow area of the outlet of the transition passageway.

16. The pressure probe as claimed in claims 9, 10, 12, 13, 14, 15, 11, 4 or 5 wherein the inlet to the alignment portion is bell mouthed.

* * * * *